(12) United States Patent
Murofushi et al.

(10) Patent No.: US 10,808,663 B2
(45) Date of Patent: Oct. 20, 2020

(54) END CAP

(71) Applicant: USUI CO., LTD., Sunto-gun, Shizuoka (JP)

(72) Inventors: Kengo Murofushi, Shizuoka (JP); Takanori Kanda, Shizuoka (JP)

(73) Assignee: USUI CO., LTD., Sunto-gun, Shizuoka (JP)

( * ) Notice: Subject to any disclaimer, the term of this patent is extended or adjusted under 35 U.S.C. 154(b) by 31 days.

(21) Appl. No.: 16/319,825

(22) PCT Filed: Jun. 26, 2017

(86) PCT No.: PCT/JP2017/023402
§ 371 (c)(1),
(2) Date: Jan. 23, 2019

(87) PCT Pub. No.: WO2018/025534
PCT Pub. Date: Feb. 8, 2018

(65) Prior Publication Data
US 2019/0264643 A1 Aug. 29, 2019

(30) Foreign Application Priority Data
Aug. 5, 2016 (JP) .................................. 2016-154971

(51) Int. Cl.
*F16L 55/115* (2006.01)
*F02M 55/00* (2006.01)
*F02M 55/02* (2006.01)

(52) U.S. Cl.
CPC .......... *F02M 55/005* (2013.01); *F02M 55/02* (2013.01); *F16L 55/115* (2013.01)

(58) Field of Classification Search
CPC ...... F16L 55/11; F16L 55/115; F02M 55/005; F02M 69/465; F02M 55/025
(Continued)

(56) References Cited

U.S. PATENT DOCUMENTS 3,675,685 A * 7/1972 Potter ..................... F16L 55/11
138/89
3,898,046 A * 8/1975 Ikeda .................. B01L 3/50825
422/550
(Continued)

FOREIGN PATENT DOCUMENTS

JP S58-065970 A 4/1983
JP H09-144624 A 6/1997
(Continued)

OTHER PUBLICATIONS

International Search Report for PCT/JP2017/023402 dated Aug. 15, 2017.

*Primary Examiner* — Patrick F Brinson
(74) *Attorney, Agent, or Firm* — Yokoi & Co., U.S.A.; Toshiyuki Yokoi

(57) ABSTRACT

To obtain an end cap that enables a brazing material ring to be appropriately placed and brazing to be reliably performed when inserting and placing an insertion part of the end cap in an end part of a rail body and securing the end cap by brazing it with the brazing material ring and, also, that is unlikely to result in a broken rail body when internal pressure is applied. An end cap to be inserted into and placed inside an end part of a rail body 2 and secured to an inner circumference of the rail body 2 by brazing, wherein an outer circumference of an insertion part 3 for insertion into the rail body 2 comprises an engagement groove 10 that is composed of a pair of side surfaces 11, 12 and a bottom surface 13 and that is capable of engagement with a brazing material ring 15.

6 Claims, 5 Drawing Sheets

(58) Field of Classification Search
USPC ..... 138/89, 90; 123/468, 469, 456; 215/355, 215/354; 220/803, 804, 789
See application file for complete search history.

(56) References Cited

U.S. PATENT DOCUMENTS

| | | | | |
|---|---|---|---|---|
| 4,269,230 | A * | 5/1981 | Pepper | F16L 45/00 138/89 |
| 4,342,419 | A * | 8/1982 | Conway | B04B 7/06 220/361 |
| 4,344,460 | A * | 8/1982 | Galos | F16L 55/11 138/89 |
| 4,750,525 | A * | 6/1988 | Vaughan | B01D 63/06 138/109 |
| 5,605,241 | A * | 2/1997 | Imperioli | B65D 47/2068 215/306 |
| 5,806,566 | A * | 9/1998 | Taylor | F16L 55/11 138/89 |
| 8,413,689 | B1 * | 4/2013 | Taylor | F16L 55/11 138/89 |
| 2007/0040375 | A1 * | 2/2007 | Fierst | F16L 55/11 285/93 |
| 2015/0007796 | A1 | 1/2015 | Schulte et al. | |
| 2017/0122278 | A1 | 5/2017 | Asahi | |
| 2017/0159626 | A1 | 6/2017 | Asahi | |

FOREIGN PATENT DOCUMENTS

| | | |
|---|---|---|
| JP | 2016-020678 A | 2/2016 |
| JP | 2016-037928 A | 3/2016 |
| KR | 2016-0069534 A | 6/2016 |

\* cited by examiner

END CAP

TECHNICAL FIELD

The present invention relates to an end cap for being securely placed in an end part of a fuel rail for gasoline direct injection engines by brazing.

BACKGROUND ART

To date, a method is known wherein an end cap is inserted into and placed in an end part of a rail body, and then the end cap is secured thereto by brazing, as set forth in FIG. 2 and paragraph 0004 of Patent Literature 1. As an example of securing the end cap to both ends of the rail body of a fuel rail by brazing in this way, the known method involves grinding the inner surface of an end part of a rail body (30) to provide a step (31), inserting and placing a brazing material ring (32) in the step (31), then inserting and placing an insertion part (34) of an end cap (33) in the end part of the rail body (30), and performing brazing in this state as shown in, for example, FIG. 5.

CITATION LIST

Patent Literature

Patent Literature 1: JP 2016-37928A

DISCLOSURE OF THE INVENTION

Problems to be Solved by the Invention

However, when the inner surface of the end part of the rail body is ground to provide a step as described above, the thickness of the ground part of the rail body is reduced, and therefore the step where grinding was performed may become the starting point of stress concentration and thus possibly break when inner pressure is applied and leak. Accordingly, in order to prevent breaking when internal pressure is applied, the rail body has to be thick and thus results in increased costs. Also, turnings are generated when grinding the rail body, and therefore such turnings may serve as foreign matter and damage the rail body. Moreover, the use of a grinding oil in grinding adds extra processes, such as degreasing and washing, and thus makes production complex.

Accordingly, an object of the present invention is to solve the above-described problem and to obtain an end cap that enables a brazing material ring to be appropriately placed and brazing to be reliably performed when inserting and placing an insertion part of the end cap in an end part of a rail body and securing the end cap by brazing it with the brazing material ring and, also, that is unlikely to result in a broken rail body when internal pressure is applied.

Means for Solving the Problem

The invention of the present application solves the above-described problem and provides an end cap to be inserted into and placed inside an end part of a rail body and secured to an inner circumference of the rail body by brazing, wherein an outer circumference of an insertion part to be inserted into the rail body comprises an engagement groove that is composed of a pair of side surfaces and a bottom surface and that is capable of engagement with a brazing material ring.

Due to the engagement groove composed of a pair of side surfaces and a bottom surface, which is provided in the insertion part of the end cap in this way, the brazing material ring placed in the engagement groove is unlikely to be displaced from the end cap. Accordingly, when the insertion part of the end cap is inserted into and placed in the rail body, the brazing material ring can be placed in the rail body while being retained in an appropriate place without that the brazing material ring is positionally shifted or displaced from the end cap, thus enabling the end cap and the rail body to be reliably brazed together.

The engagement groove may have a U-shaped cross section composed of a bottom surface and both side surfaces to be capable of retaining the brazing material ring such that the brazing material ring is unlikely to be displaced.

The end cap may comprise a tapered wall surface, a diameter on a distal end surface side of which is reduced, between a distal end surface and a circumferential surface of the insertion part. The tapered wall surface provided on the insertion part in this way facilitates placement of the brazing material ring on the outer circumference of the insertion part when placing the brazing material ring from the distal end of the insertion part. Accordingly, the work of placing the brazing material ring in the engagement groove can be smoothly performed.

The outer circumference of the proximal end may comprise a contact flange that projects outward of the rail body and that is capable of contacting the end surface of the rail body. Due to the contact flange provided in this way, the brazing material flows to a place between the contact flange and the end surface of the rail body when brazing work is performed on the end cap while laying the rail body horizontally. Accordingly, the brazing material can be visually recognized from the outside appearance, and it is thus possible to indirectly verify that the portion where the rail body and the end cap are in contact is entirely brazed.

Effects of the Invention

In the invention of the present invention, as described above, due to the engagement groove composed of a pair of side surfaces and a bottom surface, which is provided in the insertion part of the end cap, the brazing material ring is unlikely to be displaced from the end cap when the brazing material ring is placed in the engagement groove. Accordingly, when the insertion part of the end cap is inserted into and placed in the rail body, the brazing material ring can be placed in the rail body while being retained in an appropriate place without that the brazing material ring is positionally shifted or displaced from the end cap, thus enabling the end cap and the rail body to be easily and reliably brazed together.

Moreover, grinding does not need to be performed on the rail body and, therefore, there is no possibility of causing stress concentration and breaking when internal pressure is applied, unlike in the case where the step for placing the brazing material ring on the rail body is formed on the rail body by grinding.

MODES FOR CARRYING OUT THE INVENTION

First Embodiment

Figure 1:
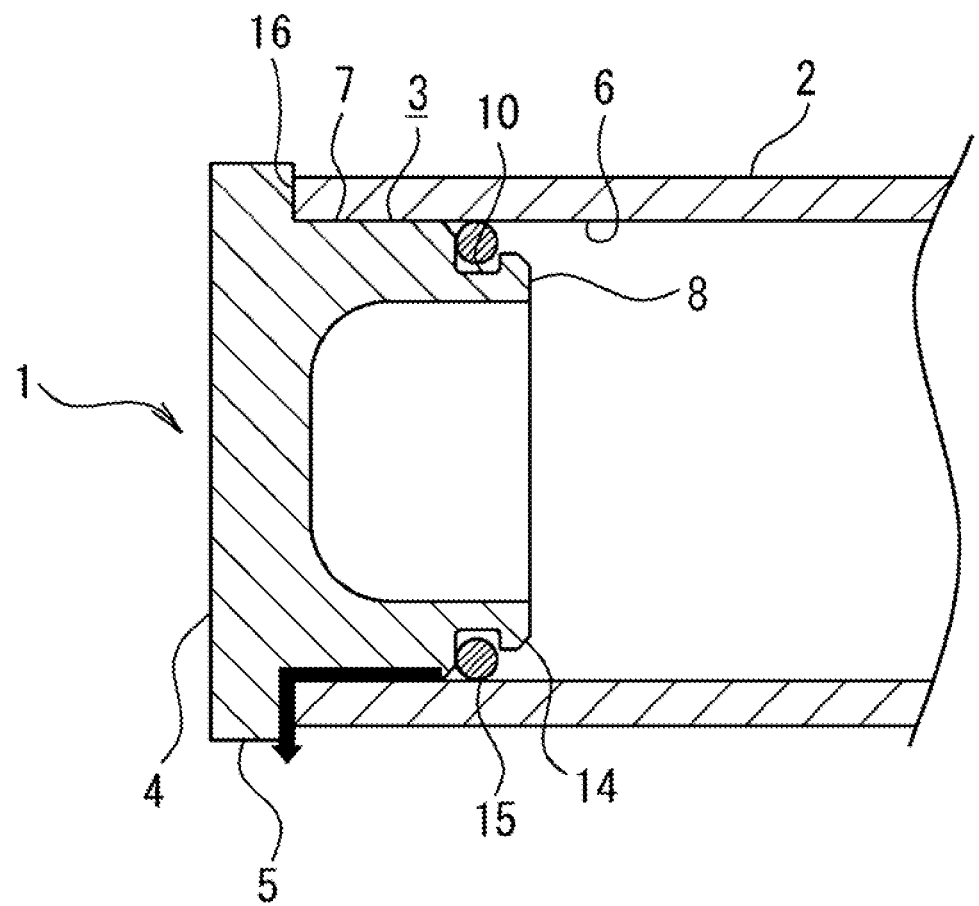
FIG. 1 is a cross-sectional view showing the first embodiment of the present invention.

The first embodiment, which is the first invention of the present application, will now be described below with reference to FIG. 1. First, (1) is an end cap, and the distal end side is an insertion part (3) for insertion into a rail body (2). The outer circumference of a proximal end (4) of the end cap (1) has a contact flange (5). The outer diameter of the insertion part (3) is substantially the same size as the inner diameter of the rail body (2), and when the insertion part (3) is inserted into and placed in the rail body (2), the insertion part (3) is placed such that an outer circumferential surface (7) of the insertion part (3) is in contact with an inner circumferential surface (6) of the rail body (2).

Figure 2:
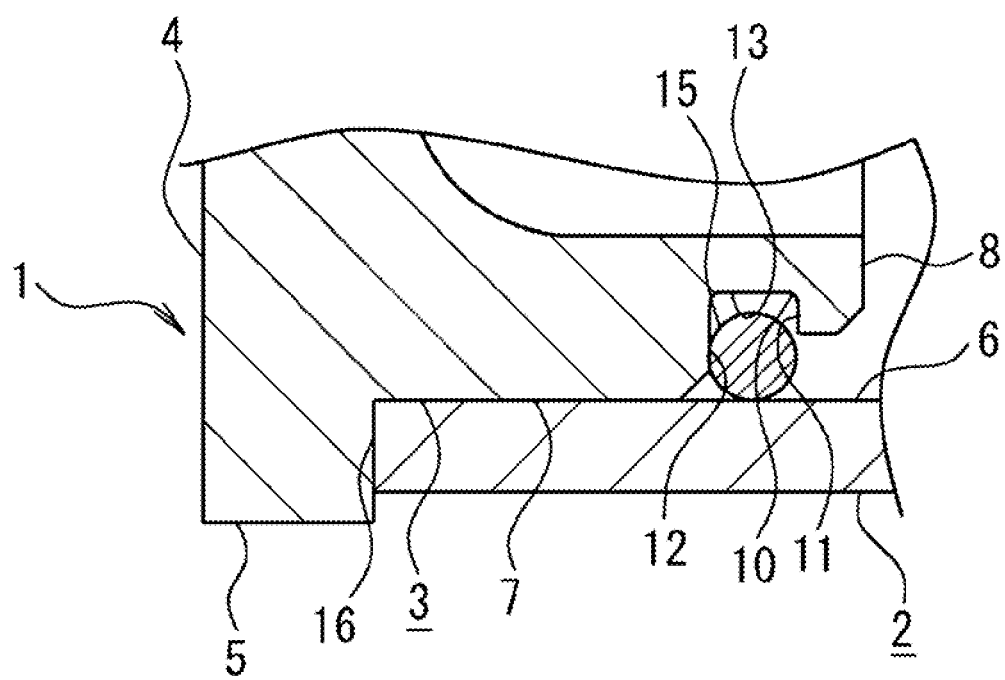
FIG. 2 is a partially enlarged cross-sectional view of FIG. 1.

The distal end side of the insertion part (3) of the end cap (1) has an engagement groove (10). As shown in FIG. 2, the engagement groove (10) is composed of a pair of side surfaces (11), (12) and a bottom surface (13) and has a U-shaped cross section. A tapered wall surface (14) having a tapered shape, the diameter on the distal end surface (8) side of which is reduced, is provided between a distal end surface (8) and the outer circumferential surface (7) of the insertion part (3).

Due to the engagement groove (10) composed of the pair of side surfaces (11), (12) and the bottom surface (13), which is provided in the insertion part (3) of the end cap (1) as described above, a brazing material ring (15) is unlikely to be displaced from the end cap (1) when the brazing material ring (15) is placed in the engagement groove (10). Accordingly, when the insertion part (3) of the end cap (1) is inserted into and placed in the rail body (2), the brazing material ring (15) can be placed in the rail body (2) while being retained in an appropriate place without that the brazing material ring (15) is positionally shifted or displaced from the end cap (1), thus enabling the end cap (1) and the rail body (2) to be easily and reliably brazed together.

Moreover, grinding does not need to be performed on the rail body (2) and, therefore, there is no possibility of causing stress concentration and breaking when internal pressure is applied, unlike in the case where the step for placing the brazing material ring (15) on the rail body is formed on the rail body (2) by grinding. Moreover, since the cross section of the engagement groove (10) has a U-shape, the brazing material ring (15) can be retained in the engagement groove (10) such that the brazing material ring (15) is unlikely to be displaced.

Then, the brazing material ring (15) is placed in the engagement groove (10) of the end cap (1) formed as described above. At this time, since the tapered wall surface (14), the diameter on the distal end surface (8) side of which is reduced, is provided at the distal end of the insertion part (3) as described above, the brazing material ring (15) can be smoothly placed in the engagement groove (10) by way of the outer circumference of the insertion part (3) from the distal end of the insertion part (3) along the tapered wall surface (14), and therefore the work of placing the brazing material ring (15) in the engagement groove (10) can be facilitated.

Inserting and placing the insertion part (3) of the end cap (1) formed as described above in the rail body (2) brings the contact flange (5) provided on the outer circumference of the proximal end (4) of the end cap (1) into contact with an end surface (16) of the rail body (2) as shown in FIG. 1. By forming and placing the end cap (1) in this way, performing brazing work while laying the rail body (2) of the end cap (1) horizontally causes the molten brazing material to flow out in the direction indicated by the arrow in FIG. 1. Accordingly, the brazing material can be visually recognized from the outside appearance, and it is thus possible to indirectly verify that the portion where the rail body (2) and the end cap (1) are in contact is entirely brazed.

Figure 3:
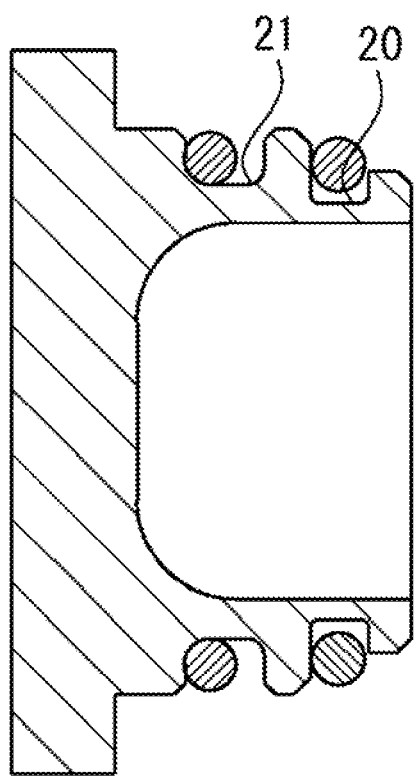
FIG. 3 is a cross-sectional view showing a different embodiment.

In the present embodiment, only one engagement groove (10) is provided in the end cap (1) as described above. However, other different embodiments are not limited thereto, and two engagement grooves (20), (21) can also be provided in one end cap (1) as shown in FIG. 3.

Figure 4A:
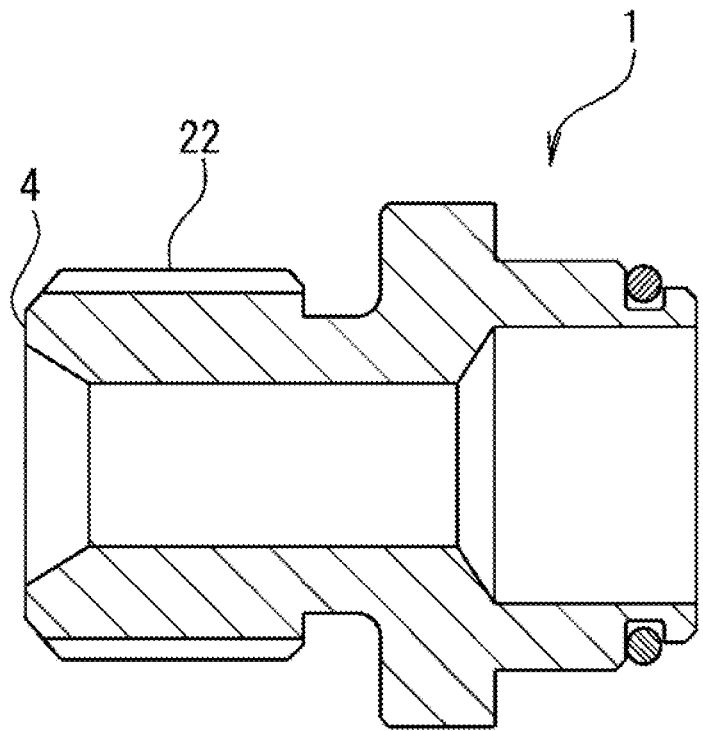
FIG. 4A is a cross-sectional view showing another different embodiment.
Figure 4B:
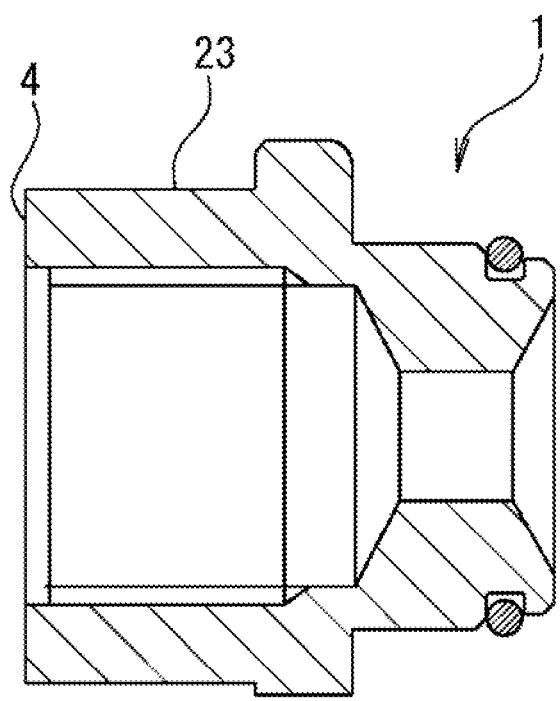
FIG. 4B is a cross-sectional view showing another different embodiment.
Figure 5:
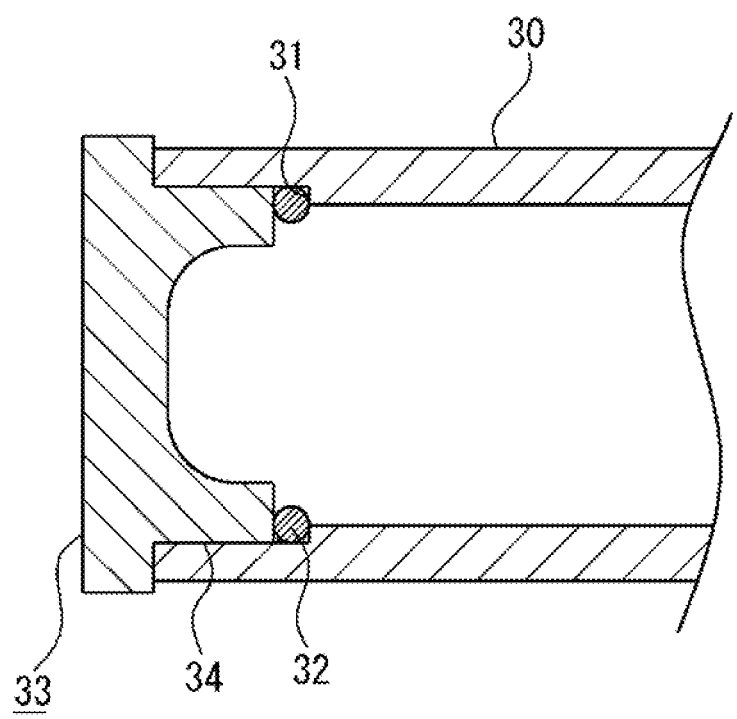
FIG. 5 is a cross-sectional view showing a conventional example.

Moreover, in the present embodiment, the contact flange (5) is provided on the proximal end (4) side of the end cap (1). However, other different embodiments are not limited thereto, and a male thread member (22) can also be integrally formed on the proximal end (4) side as shown in FIG. 4A, and a female thread member (23) can also be integrally formed on the proximal end (4) side as shown in FIG. 4B.

DESCRIPTION OF THE REFERENCE NUMERALS

1 End cap
2 Rail body
3 Insertion part
4 Proximal end
5 Contact flange
7 Outer circumferential surface
8 Distal end surface
10, 20, 21 Engagement groove
11, 12 Side surface
13 Bottom surface
14 Tapered wall surface
15 Brazing material ring
16 End surface

The invention claimed is:

1. An end cap to be inserted into and placed inside an end part of a rail body and secured to an inner circumference of the rail body by brazing, wherein
the end cap comprises an insertion part that is inserted into the rail body,
an outer circumference of the insertion part comprises an engagement groove that is composed of a pair of side surfaces and a bottom surface and that is capable of engagement with a brazing material ring, and
one of the pair of side surfaces is not in contact with the inner circumference of the rail body in a state that the end cap is inserted into the rail body.

2. The end cap according to claim 1, wherein the engagement groove has a U-shaped cross section composed of the bottom surface and both side surfaces, and is capable of retaining the brazing material ring such that the brazing material ring is unlikely to be displaced.

3. The end cap according to claim 1, wherein the outer circumference of the insertion part comprises a tapered wall surface, a diameter on a distal end surface side of which is reduced, between a distal end surface and a circumferential surface of the insertion part.

4. The end cap according to claim 1, wherein an outer circumference of a proximal end comprises a contact flange that projects outward of the rail body and that is capable of contacting an end surface of the rail body.

5. The end cap according to claim 1, wherein an inner diameter of the rail body is constant between a part in contact with the insertion part and other parts.

6. The end cap according to claim 1, wherein one of the pair of side surfaces located at an opposite side of an insertion direction of the end cap includes a tapered wall surface.

* * * * *